United States Patent
Zeng et al.

(10) Patent No.: US 9,152,526 B2
(45) Date of Patent: Oct. 6, 2015

(54) METHOD AND APPARATUS FOR STATE OF HEALTH ESTIMATION OF OBJECT SENSING FUSION SYSTEM

(71) Applicant: GM GLOBAL TECHNOLOGY OPERATIONS LLC, Detroit, MI (US)

(72) Inventors: Shuqing Zeng, Sterling Heights, MI (US); Yilu Zhang, Northville, MI (US); Bakhtiar Brian Litkouhi, Washington, MI (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 13/679,849

(22) Filed: Nov. 16, 2012

(65) Prior Publication Data
US 2014/0142800 A1     May 22, 2014

(51) Int. Cl.
*G06F 11/30* (2006.01)

(52) U.S. Cl.
CPC .................................. *G06F 11/3055* (2013.01)

(58) Field of Classification Search
CPC ......... G01S 13/00; G06F 19/00; G06F 17/10; G08G 1/16; G05D 13/00
USPC ........................ 701/3, 30.6, 70, 301; 382/103
See application file for complete search history.

(56) References Cited

U.S. PATENT DOCUMENTS

| | | | | |
|---|---|---|---|---|
| 4,255,799 A | * | 3/1981 | Laing | 367/96 |
| 6,513,022 B1 | * | 1/2003 | Morgan | 706/16 |
| 7,991,550 B2 | * | 8/2011 | Zeng | 701/301 |
| 2008/0306666 A1 | * | 12/2008 | Zeng et al. | 701/70 |
| 2009/0138141 A1 | * | 5/2009 | Nwadiogbu et al. | 701/3 |
| 2010/0191391 A1 | * | 7/2010 | Zeng | 701/1 |
| 2012/0002016 A1 | * | 1/2012 | Zhang et al. | 348/47 |
| 2012/0140061 A1 | * | 6/2012 | Zeng | 348/135 |
| 2013/0242284 A1 | * | 9/2013 | Zeng | 356/4.01 |

* cited by examiner

*Primary Examiner* — Helal A Algahaim
*Assistant Examiner* — Michael Fouche
(74) *Attorney, Agent, or Firm* — John A. Miller; Miller IP Group, PLC

(57) ABSTRACT

A method and system for estimating the state of health of an object sensing fusion system. Target data from a vision system and a radar system, which are used by an object sensing fusion system, are also stored in a context queue. The context queue maintains the vision and radar target data for a sequence of many frames covering a sliding window of time. The target data from the context queue are used to compute matching scores, which are indicative of how well vision targets correlate with radar targets, and vice versa. The matching scores are computed within individual frames of vision and radar data, and across a sequence of multiple frames. The matching scores are used to assess the state of health of the object sensing fusion system. If the fusion system state of health is below a certain threshold, one or more faulty sensors are identified.

13 Claims, 7 Drawing Sheets

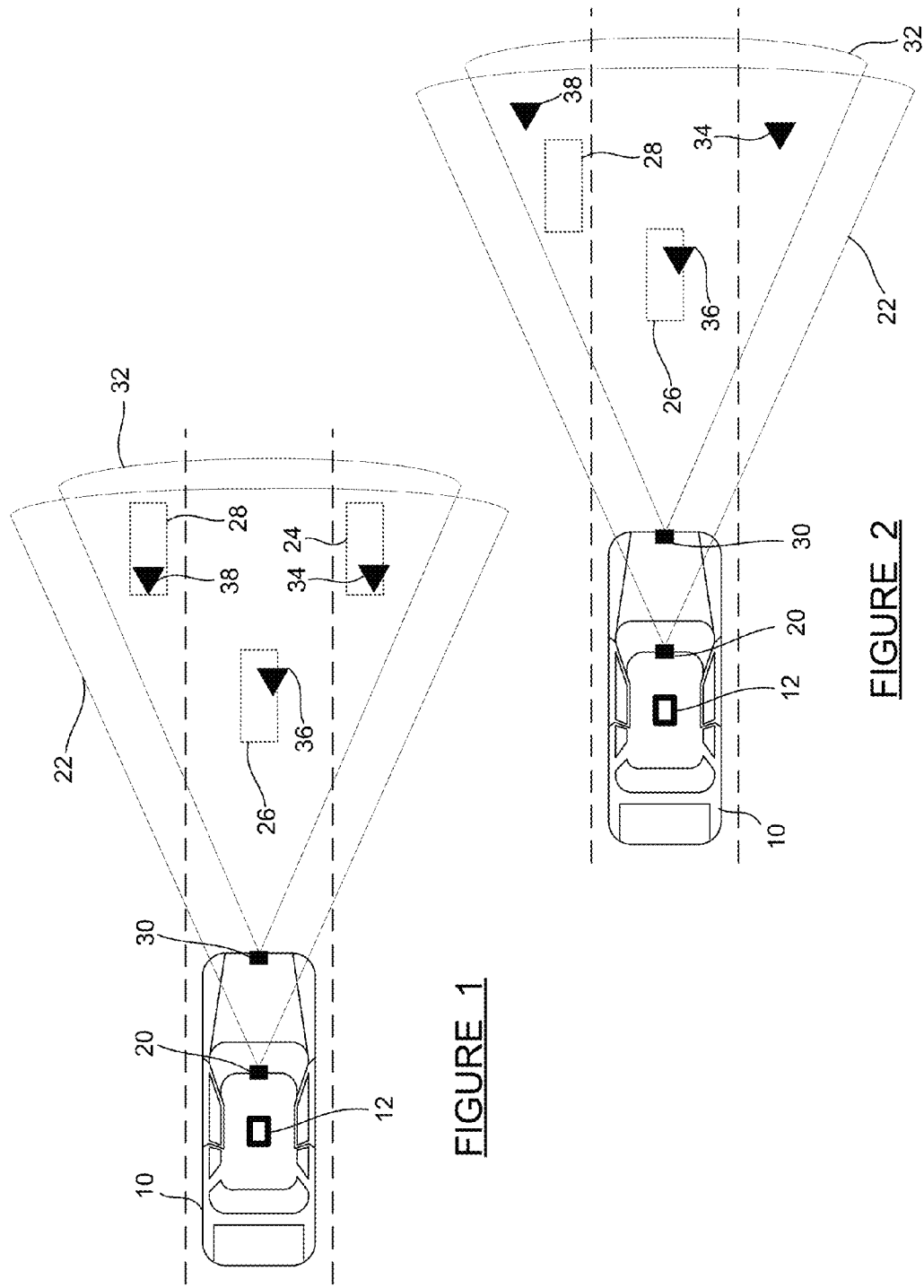

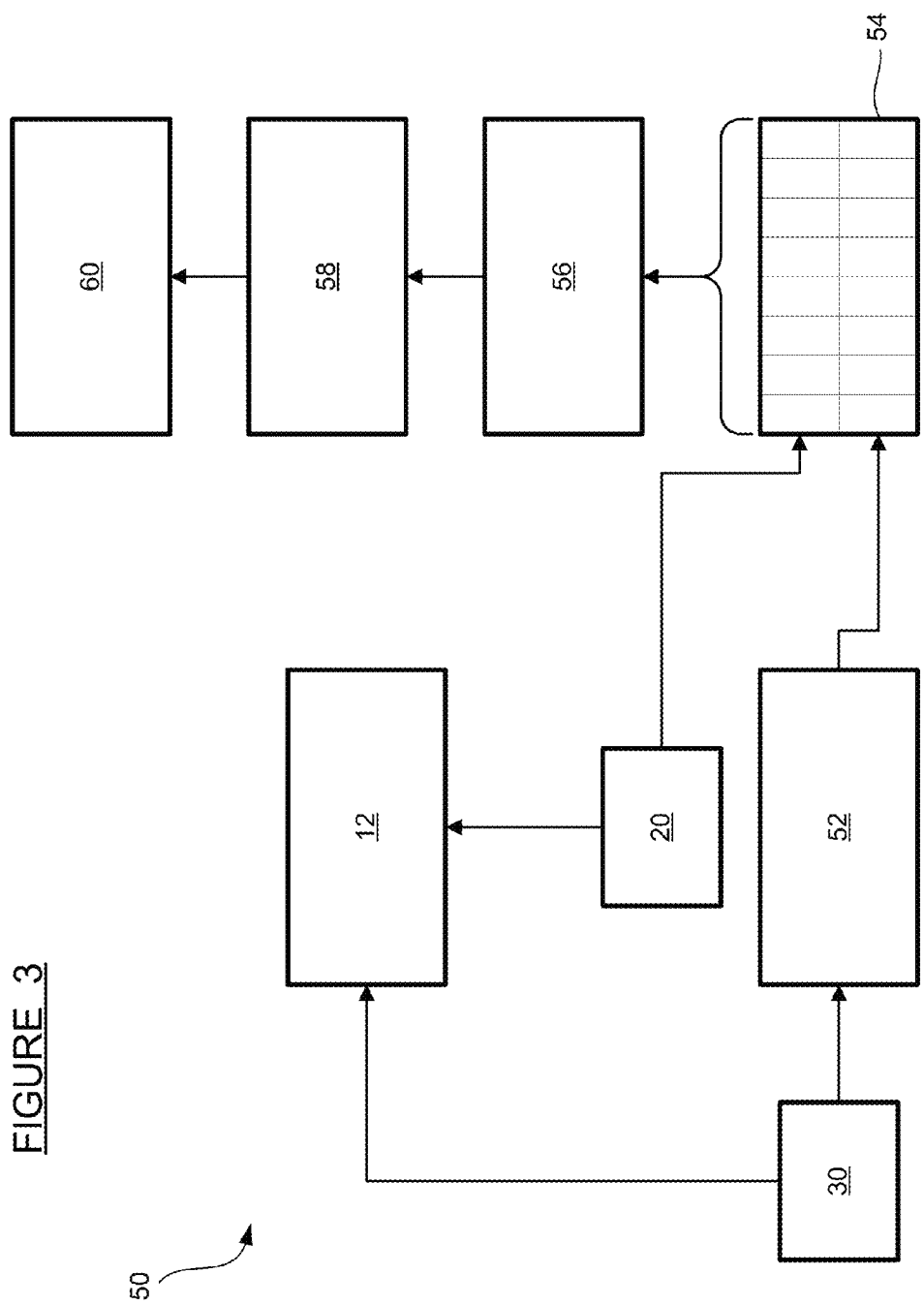

METHOD AND APPARATUS FOR STATE OF HEALTH ESTIMATION OF OBJECT SENSING FUSION SYSTEM

BACKGROUND OF THE INVENTION

1. Field of the Invention

This invention relates generally to estimating state of health of an object sensing fusion system and, more particularly, to a method for estimating state of health of an object sensing fusion system in which target data from two or more object sensors with an overlapping field of view are analyzed to determine target correlation matching scores, where the matching scores are calculated both within individual frames of data and across a sequence of frames.

2. Discussion of the Related Art

Object detection systems, also known as object sensing systems, have become increasingly common in modern vehicles. Object detection systems can provide a warning to a driver about an object in the path of a vehicle. Object detection systems can also provide input to active vehicle systems—such as Adaptive Cruise Control, which controls vehicle speed to maintain appropriate longitudinal spacing to a leading vehicle, and Collision Avoidance systems, which can control both steering and braking to attempt to avoid an imminent collision.

Object detection systems use one or more sensors, which may be radar, lidar, camera, or other technologies, to detect the presence of an object in or near the path of a host vehicle. Software is used to track the relative motion of objects over time, determine if the objects are moving or stationary, determine what each object is likely to be (another vehicle, a pedestrian, a tree, etc.), and determine whether each object poses a collision threat to the host vehicle.

Object sensing fusion systems are also known in the art, where the fusion system performs a fusion calculation on target data from two or more sensors, and provides a more robust assessment of in-path objects as a result. However, even with an object sensing fusion system, it is possible for accuracy to suffer if a sensor fails, or if a sensor is partially or completely obscured by dirt or debris, or if a sensor is blinded by direct sun or other light. It would be advantageous to have an assessment of the state of health of the object sensing fusion system, and an indication of possible faulty sensors if the state of health is low.

SUMMARY OF THE INVENTION

In accordance with the teachings of the present invention, a method and system are disclosed for estimating the state of health of an object sensing fusion system. Target data from a vision system and a radar system, which are used by an object sensing fusion system, are also stored in a context queue. The context queue maintains the vision and radar target data for a sequence of many frames covering a sliding window of time. The target data from the context queue are used to compute matching scores, which are indicative of how well vision targets correlate with radar targets, and vice versa. The matching scores are computed within individual frames of vision and radar data, and across a sequence of multiple frames. The matching scores are used to assess the state of health of the object sensing fusion system. If the fusion system state of health is below a certain threshold, one or more faulty sensors are identified.

Additional features of the present invention will become apparent from the following description and appended claims, taken in conjunction with the accompanying drawings.

BRIEF DESCRIPTION OF THE DRAWINGS

FIG. 1 is a schematic diagram of a vehicle with a vision system and a radar system, where all targets detected by the vision system match targets detected by the radar system;

FIG. 2 is a schematic diagram of the vehicle of FIG. 1, where mismatches exist between the targets detected by the vision system and the targets detected by the radar system;

FIG. 3 is a block diagram of a system for estimating the state of health of an object sensing fusion system, and identifying any failed sensors;

DETAILED DESCRIPTION OF THE EMBODIMENTS

Figure 4:
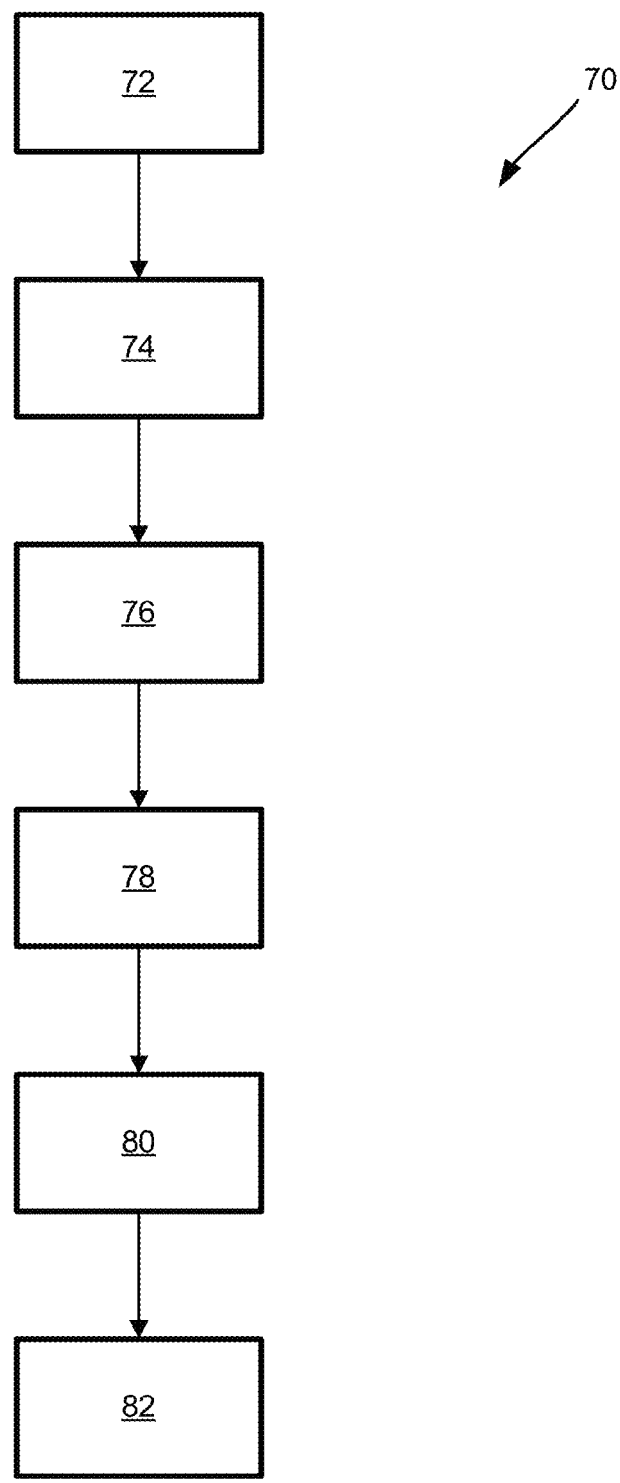
FIG. 4 is a flowchart diagram of a method for estimating the state of health of an object sensing fusion system, and identifying any failed sensors.

The following discussion of the embodiments of the invention directed to a method and apparatus for estimating the state of health of an object sensing fusion system is merely exemplary in nature, and is in no way intended to limit the invention or its applications or uses.

Many modern vehicles include an object sensing system for detecting objects in the path of the vehicle. The object sensing system can provide a warning to a driver, or even trigger other systems to take evasive action to avoid a vehicle collision. Some vehicles also include an object sensing fusion system, which numerically "fuses" the data from two or more object detection sensors and then bases its object detection logic on the fused object data. One such fusion system is described in U.S. Pat. No. 7,460,951, which is assigned to the assignee of the present application, and which is hereby incorporated by reference in its entirety.

However, even with an object sensing fusion system and two or more object sensors, accuracy can suffer if an object detection sensor is faulty or is obscured in some way. The nature of this problem is illustrated in FIGS. 1 and 2.

FIG. 1 is a schematic diagram of a vehicle 10 including multiple object detection sensors. The vehicle 10 includes an object sensing fusion system 12, which in turn receives data from a vision system 20 and a radar system 30. The fusion system 12 comprises a device including a microprocessor and a memory module, said device being configured with software to perform object sensing fusion—which is a way of combining target data from two object sensor systems to produce a more robust result. Other applications, besides object sensing fusion, may also run on the same microprocessor as the fusion system 12. The vision system 20 includes at least a camera (not separately shown) and a processor configured to detect and track objects in the camera images.

The radar system 30 includes at least a radar transmit/receive unit (not separately shown) and a processor configured to detect and track objects in the radar returns. The vision system 20 and the radar system 30 communicate with and provide their object sensing target data to the fusion system 12, typically by a wired connection over a vehicle bus, but this communication could be wireless.

The vision system 20 has a vision coverage area 22, in which vision targets 24, 26 and 28 exist. The radar system 30 has a radar coverage area 32, in which radar targets 34, 36 and 38 exist. In the FIG. 1 illustration, all targets detected by the vision system 20 match targets detected by the radar system 30. This is a normal state of operation, indicating both the vision system 20 and the radar system 30 are operating properly. In this situation, the fusion system 12 receives well-matched target data from the vision system 20 and the radar system 30, and can effectively fuse the target data and accurately identify objects in or near the path of the vehicle 10.

It is to be noted that only targets which exist in zones where the vision system 20 and the radar system 30 have a common field-of-view can be used for comparison. That is, targets in areas where the vision coverage area 22 overlaps the radar coverage area 32, as are all of the targets in FIG. 1.

FIG. 2 is a schematic diagram of the vehicle 10 of FIG. 1, where mismatches exist between the targets detected by the vision system 20 and the targets detected by the radar system 30. In FIG. 2, the vision target 26 still correlates well with the radar target 36. However, no vision target exists which correlates with the radar target 34, and the vision target 28 does not correlate well with the radar target 38. This lack of correlation could be caused by a partial blockage of the vision system 20, or by a faulty sensor in the vision system 20, the radar system 30 or both. In a situation such as illustrated in FIG. 2, it would be advantageous to provide an assessment of a possibly diminished state of health of the object sensing fusion system 12, and also provide an indication of which object sensor is likely experiencing a fault or blockage.

FIG. 3 is a block diagram of a system 50 for estimating the state of health of the object sensing fusion system 12, and identifying any failed sensors. The vision system 20 and the radar system 30 provide their respective target data to the object sensing fusion system 12, as discussed previously. In addition, the vision system 20 provides vision targets to a context queue 54, where they are stored for a certain period of time and used to assess fusion system state of health, as will be discussed below. The radar system 30 provides radar targets to the context queue 54 by way of an alignment module 52. The alignment module 52 performs a position transformation on the coordinate frame of the radar system 30 to achieve optimal alignment of the radar targets with the vision targets. The alignment module 52 compensates for any relatively steady state misalignment of the radar system coordinate frame and the vision system coordinate frame, which may be caused by physical misalignment of a sensor or internal calibration factors. An embodiment of the alignment module 52 is described in U.S. Pat. No. 7,991,550, which is assigned to the assignee of the present application, and which is hereby incorporated by reference in its entirety.

The context queue 54 is a buffer which contains vision target data and radar target data for a sliding window of time. The data in the context queue 54 is organized into "frames", or snapshots in time. The data frames are maintained in the buffer of the context queue 54 for a certain period of time, then discarded when they become too stale to be of any use. The context queue 54 provides the frame data—containing vision targets and radar targets—to a matching score computation module 56. The matching score computation module 56 computes matching scores, which are an indication of how well the vision targets correlate with the radar targets. The matching scores includes a score for target matching within individual frames and a score for target matching across a sequence of frames, as will be discussed in detail below.

The matching scores from the matching score computation module 56 are provided to a state of health estimation module 58, which determines a value for the state of health of the fusion system 12 based on the matching scores. If the state of health value is below a predetermined threshold, which may be in the range of 50-70%, then a fault identification module 60 identifies one or more faulty sensors. The fault identification module 60 uses data from the vision system 20, the radar system 30 and the matching score computation module 56 to identify faulty sensors, as will be discussed below.

The state of health value and the faulty sensor information, if any, can be used by the fusion system 12 and by other vehicle control systems (not shown) to enhance the performance of vehicle control applications which use the object sensing data.

It is also noted that the system 50 could include more or different object sensing systems than the vision system 20 and the radar system 30. For example, some vehicles are equipped with a front-left and a front-right radar system (not shown), which provide object sensing coverage in lateral areas ahead of the vehicle. Although these other object sensing systems, such as the front-left and front-right radar systems, may have different ranges and fields-of-view than straight-ahead vision or radar systems, they still typically have significant areas of overlapping coverage, and therefore can be used to great benefit in the system 50.

FIG. 4 is a flowchart diagram 70 of a method for estimating the state of health of the object sensing fusion system 12, and identifying any failed sensors. At box 72, vision target data from the vision system 20, and radar target data from the radar system 30, are provided. At box 74, the radar target data are aligned to the coordinate frame of the vision system 20, as described previously in the discussion of the alignment module 52. At box 76, the context queue 54 is created, containing targets from the vision target data and the radar target data for a plurality of frames, or instants in time.

At box 78, matching scores are calculated based on the target data in the context queue 54. At box 80, a state of health of the object sensing fusion system 12 is calculated from the matching scores. If the state of health of the fusion system 12 is determined to be below a certain threshold, one or more faulty sensors are identified at box 82. The matching scores and the state of health may be calculated by the processor in the fusion system 12 or another onboard vehicle processor, or the elements 52-60 of the system 50 may be packaged as a processing module unto themselves. In any case, the matching score and state of health calculations are performed on some controller or microprocessor onboard the vehicle 12. The matching score calculations performed at the box 78, the state of health calculation performed at the box 80 and the faulty sensor identification performed at the box 82 will be discussed in detail below.

Figure 5:
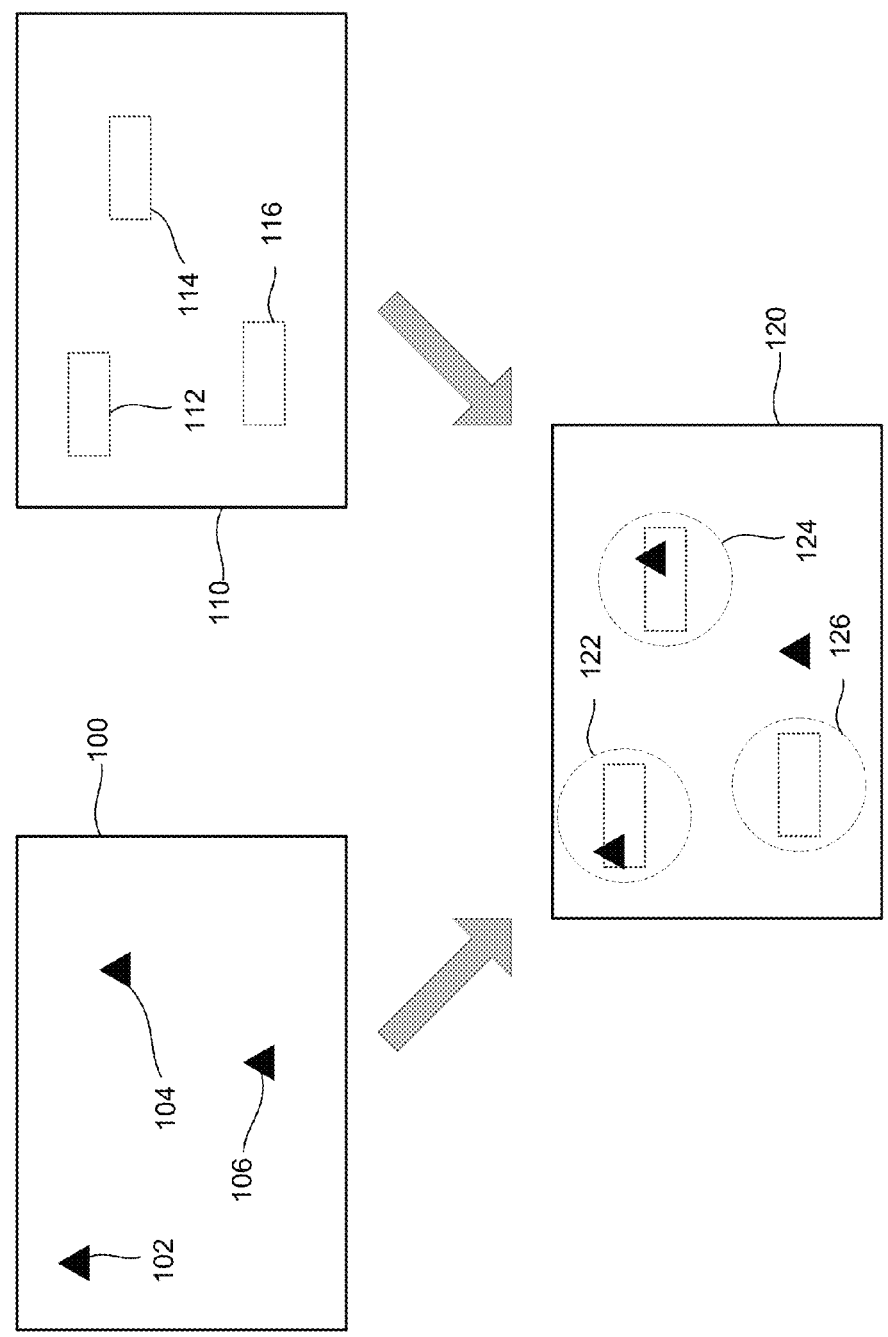
FIG. 5 is an illustration of the concept of a matching score computation within a single frame of data from two sensors.

FIG. 5 is an illustration of the concept of a matching score computation within a single frame of the context queue 54, where the frame contains target data from the vision system 20 and from the radar system 30. At a particular time frame f of the context queue 54, a radar frame 100 contains radar targets 102, 104 and 106. At the same time frame f, a vision frame 110 contains vision targets 112, 114 and 116. A combined frame 120 contains both the radar targets 102-106 and the vision targets 112-116 for the time frame f. Also shown in the combined frame 120 are neighborhood cirlces 122, 124 and 126, where the neighborhood cirlces 122-126 have a radius R and are drawn around the center of each of the vision targets 112-116. The neighborhood cirlces 122-126 are used to determine which of the vision targets 112-116 have a matching radar target.

It can be seen in the combined frame 120 of the example shown in FIG. 5 that the neighborhood cirlces 122 and 124 each contain a matched radar and vision target, but the neighborhood circle 126 contains the vision target 116 with no matching radar target. The radar target 106 sits alone, unmatched, in the combined frame 120. This situation could be due to a sensor failure or misalignment, and will be reflected in the matching score for the combined frame 120, which will now be discussed in detail.

A matching score $S_f$ is defined as the matching score within a particular time frame, in this case the combined frame 120. The matching score $S_f$ is defined such that a smaller score represents better matching of the sensor targets or objects within the frame. First, three statistics are determined for the frame of interest. A value $n_1$ is defined as the number of matched pairs of vision and radar objects within the frame. For the combined frame 120 of FIG. 5, $n_1=2$, as represented by the matched radar and vision targets within the neighborhood cirlces 122 and 124. For each matched pair i, a distance $d_i$ is computed as the distance from the center of the vision object to the center of the matching radar object. A value $n_2$ is defined as the number of unmatched vision objects within the frame. For the combined frame 120 of FIG. 5, $n_2=1$, as represented by the neighborhood circle 126 containing the vision target 116 with no matching radar target. A value $n_3$ is defined as the number of unmatched radar objects within the frame. For the combined frame 120 of FIG. 5, $n_3=1$, as represented by the radar target 106 which sits alone, unmatched.

The matching score $S_f$ can then be calculated as:

$$S_f = \left(\sum_{i=1}^{n_1} d_i + n_2 P_{mis\_R} + n_3 P_{mis\_V}\right) / (n_1 + n_2 + n_3) \quad (1)$$

Where $P_{mis\_R}$ is the penalty cost of each missing radar object, and $P_{mis\_V}$ is the penalty cost of each missing vision object.

The radius R and the penalty costs $P_{mis\_R}$ and $P_{mis\_V}$ can be designed to achieve the desired discrimination in the matching score $S_f$, where a very well matched frame has a matching score near zero, and a poorly matched frame has a higher matching score which depends on the values of the penalty costs (which could be equal to one or higher). The matching score $S_f$ can be computed for each new time frame f of the context queue 54.

Figure 6:
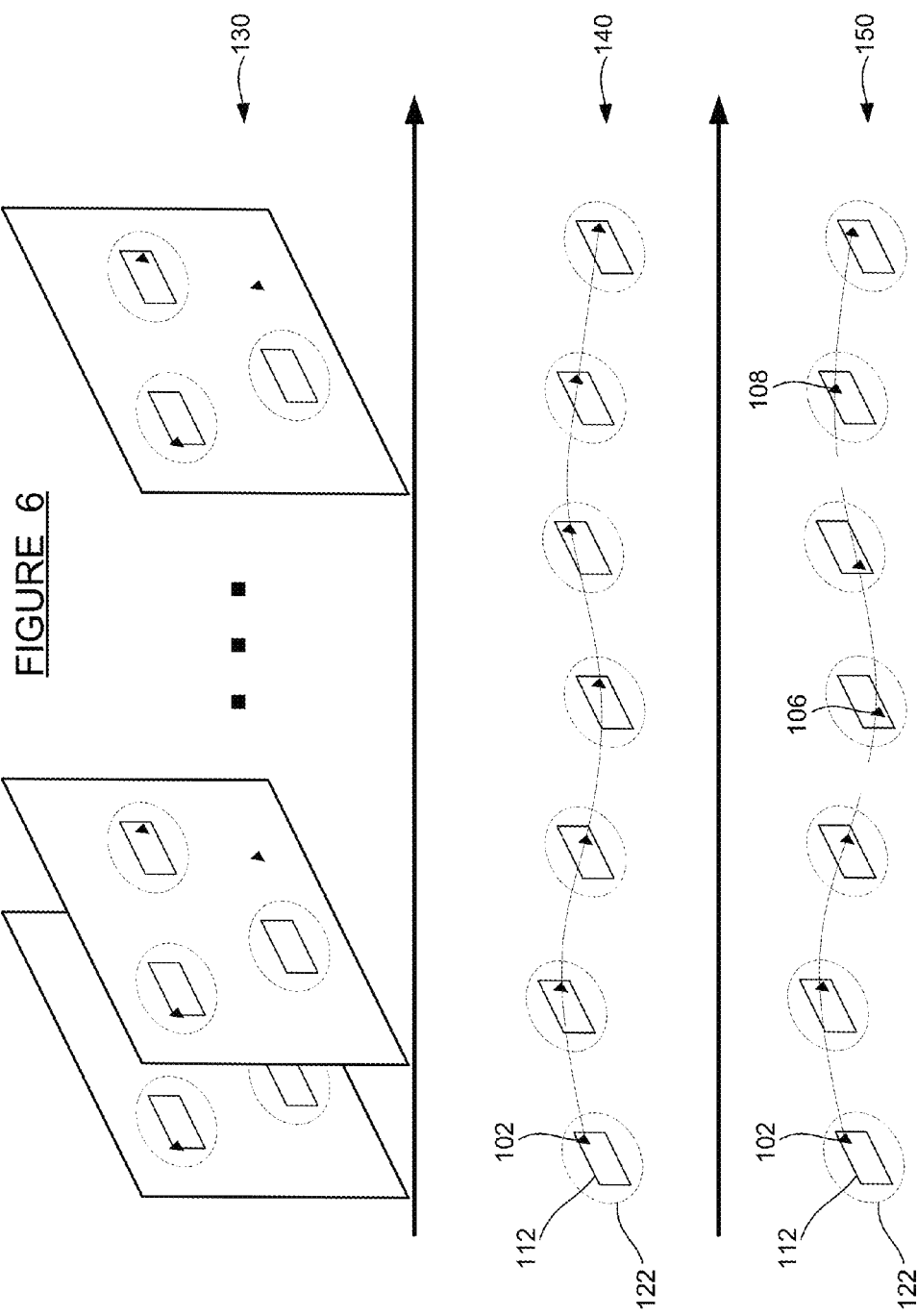
FIG. 6 is an illustration of the concept of a matching score computation across a sequence of frames of data from two sensors.

FIG. 6 is an illustration of the concept of a matching score computation across a sequence of frames of data from the context queue 54, where each frame contains target data from the vision system 20 and from the radar system 30. As mentioned previously, the context queue 54 stores frames for a certain amount of time, such that the queue 54 always contains a sliding window of data. The single-frame matching score $S_f$, described above, is computed for each new frame f as frames are added to the context queue 54. Using the data stored in the context queue 54, it is then possible to compute a matching score across a sequence of frames, as illustrated in FIG. 6 and discussed below.

In FIG. 6, a sequence 130 contains a number of frames K from the context queue 54. The frames in the sequence 130 span a time window running from left to right. The single-frame matching score $S_f$, has already been computed for each of the frames in the sequence 130. A sequence matching score $S_{seq}$ can then be computed based on the single-frame matching scores $S_f$ for each of the K frames in the sequence 130, and also based on the amount of switching of targets in matched pairs across the sequence 130.

The sequence 140 focuses on the targets within the neighborhood circle 122 across the K frames of data. In the sequence 140, K=7. At the beginning of the sequence 140 (on the left-hand side), the neighborhood circle 122 contains the vision target 112, which is used to define the center of the circle 122, and the radar target 102. Although the location of the radar target 102 moves around slightly relative to the vision target 112, the matched pair remains the same. That is, throughout the sequence 140, the radar target 102 is matched with the vision target 112.

The sequence 150 represents another scenario, where target switching occurs within the matched pairs over time. At the beginning of the sequence 150, again the neighborhood circle 122 contains the vision target 112 and the radar target 102. However, after three frames, the radar target 102 no longer appears within the neighborhood circle 122; it is replaced instead with the radar target 106. Two frames later, the radar target changes again, this time to radar target 108. These changes, or switches, in a matched pair of targets across a sequence of frames will be reflected in a higher value of the sequence matching score $S_{seq}$, which can be defined as:

$$S_{seq} = \left(\sum_{f=1}^{K} S_f + n_{switch} P_{switch}\right) / (K) \quad (2)$$

Where $n_{switch}$ is the number of target switches within the sliding time window, and $P_{switch}$ is the penalty cost of each target switch. In the sequence 150, K=7 and $n_{switch}=2$. A smaller value of the sequence matching score, $S_{seq}$, indicates a better match between radar and vision targets, as was the case with the single-frame matching scores $S_f$.

As each new frame f is added to the context queue 54, the sliding time window of the sequence 130 is adjusted and the sequence matching score $S_{seq}$ is re-computed. Thus, matching scores are continuously updated as the vision system 20 and the radar system 30 track objects during driving of the vehicle 10.

In FIGS. 5 and 6, the neighborhood circles are drawn around the center of each vision object. That is, the vision system 20 is used as the reference, and radar target data deviation is measured. The radar system 30 could be used instead as the reference, and vision target data deviation could be measured. It is noted that the sequence matching score, $S_{seq}$, may be different depending on which sensor is used as the reference. It is also possible to compute the sequence matching score, $S_{seq}$, both ways, in which case a sequence matching score using the vision system 20 as the reference is designated as $S_{seq\_Vision}$, and a sequence matching score using the radar system 30 as the reference is designated as $S_{seq\_Radar}$. The sequence matching scores are computed in the matching score computation module 56 described previously in the discussion of FIG. 3.

Figure 7:
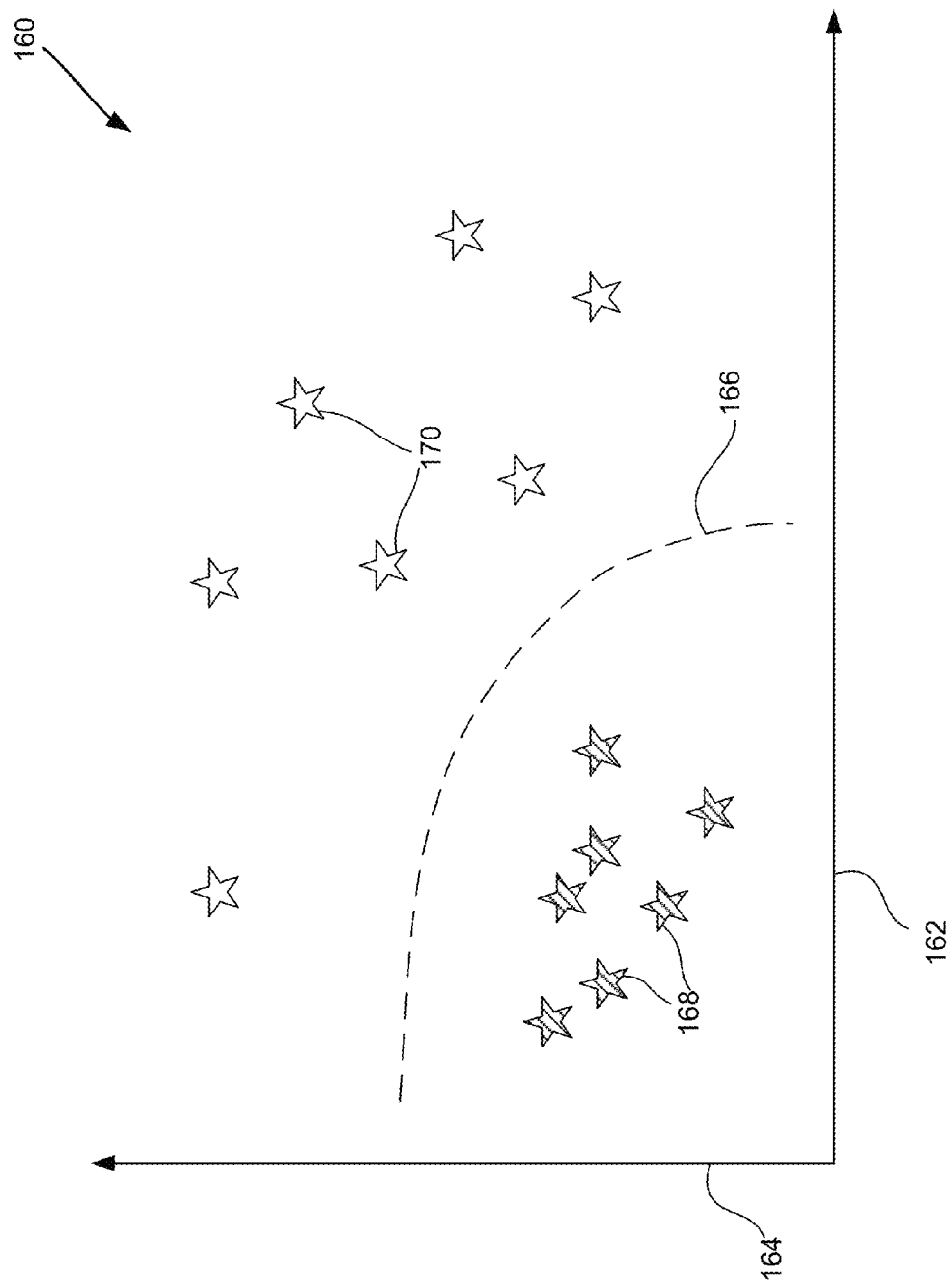
FIG. 7 is a graph showing how the matching scores across a sequence of frames relate to fusion system state of health.

FIG. 7 is a graph 160 showing how the matching scores across a sequence of frames relate to fusion system state of health. Horizontal axis 162 represents the sequence matching score using the radar system 30 as the reference, $S_{seq\_Radar}$, while vertical axis 164 represents the sequence matching score using the vision system 20 as the reference, $S_{seq\_Vision}$. For each time sequence, both sequence matching scores, $S_{seq\_Radar}$ and $S_{seq\_Vision}$, are calculated, and the resultant data point is plotted on the graph 160. For a healthy fusion system, both sequence matching scores are small, and the spread between the data points is small. Line 166 represents a boundary between healthy fusion system data points 168 and unhealthy fusion system data points 170. For the data points 170, it can be seen that one or both of the sequence matching scores is large.

A regression function from the two sequence matching scores to the fusion system state of health can be established using a learning algorithm. Examples of learning algorithms include support vector machine, nearest neighbor, neural network, and discriminant analysis. Other types of learning algorithms may also be used. As an example, the probability that the fusion system 12 is healthy (has a value SOH=100%) can be written as:

$$p(SOH = 100\%) = \frac{1}{1 + \exp(\beta_0 + \beta_1 S_{seq\_Vision} + \beta_2 S_{seq\_Radar})} \quad (3)$$

Where $\beta_0$, $\beta_1$ and $\beta_2$ are calibrated from training data. It can be seen from Equation 3 that higher values of the matching scores, $S_{seq\_Radar}$ and $S_{seq\_Vision}$, result in a lower probability of a healthy fusion system. A fusion system state of health value can be equated to the probability of a fully healthy system, calculated in Equation 3. This calculation is performed in the state of health estimation module 58, described previously in the discussion of FIG. 3.

Figure 8:
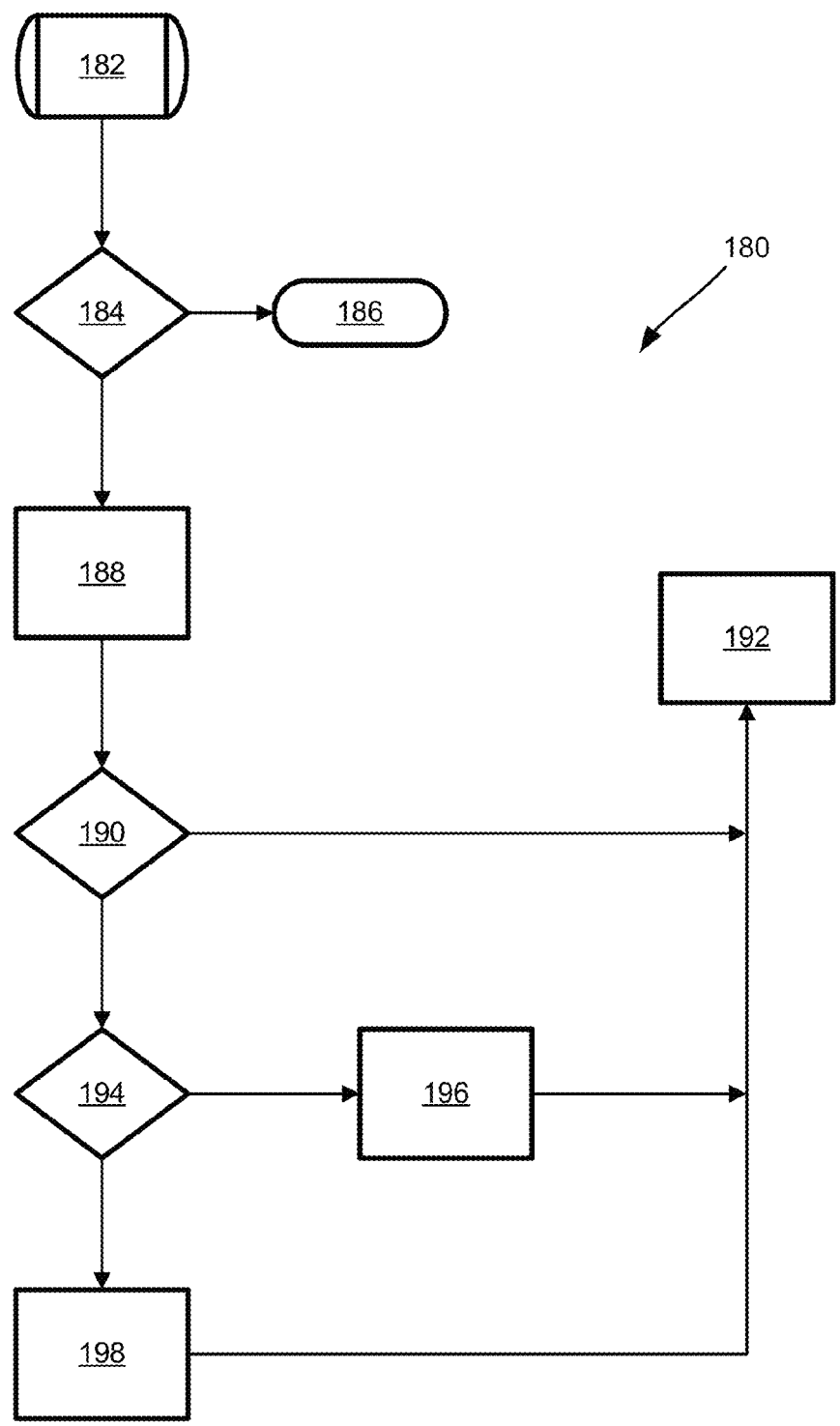
FIG. 8 is a flowchart diagram of a method for identifying one or more faulty object detection sensors when fusion system state of health is determined to be below a threshold.

FIG. 8 is a flowchart diagram 180 of a method for identifying one or more faulty object detection sensors when fusion system state of health is determined to be below a threshold. The faulty sensor identification of the flowchart diagram 180 is performed in the fault identification module 60, discussed previously. At start box 182, fusion system state of health is provided from the state of health estimation module 58. At decision diamond 184, it is determined whether fusion system state of health is greater than a predetermined threshold, such as 70%. If the state of health is above the threshold, no identification of faulty sensors is required, and the process ends at terminus 186. The process begins again at the start box 182 when a new state of health value is provided from the state of health estimation module 58.

If the fusion system state of health is below the threshold at the decision diamond 184, then at box 188 self-diagnostic information is collected from each object detection sensor system. For example, both the vision system 20 and the radar system 30 would typically have self-diagnostic capability to detect some types of internal faults. At decision diamond 190, the self-diagnostic information from each object detection sensor system is evaluated to determine if any of the object sensors are reporting a low state of health value. If any of the object sensors reports a state of health value below a predetermined threshold, which could again be 70% or any other appropriate value, then the faulty sensor identification is complete at box 192. Note that there may be more than one faulty sensor. Conversely, there may be no sensors reporting a low state of health, as some external factor such as blockage or blinding saturation may be causing inaccurate sensor readings.

If none of the objects sensors reports a state of health value below the threshold, then at decision diamond 194 it is determined how many object sensors are included in the vehicle 10 and providing data to the fusion system 12. If the number of object sensors is less than three (that is, two), then at box 196 the sensor which is experiencing more frequent target switching in a sequence is identified. That is, in the current sequence, if the number of target switches using the vision system 20 as the reference ($n_{switch\_Vision}$) is high, then the radar system 30 may be faulty. Conversely, if the number of target switches using the radar system 30 as the reference ($n_{switch\_Radar}$) is high, then the vision system 20 may be faulty. Again, the faulty sensor identification is then complete at the box 192.

If the number of object sensors is three or more, then at box 198 another technique known as majority consistency is used to identify the faulty sensor. For example, if there are three object sensors onboard, then sequence matching scores can be computed between each pair of sensors. The sequence matching score between sensors 1 and 2 can be designated $S_{seq\_1\_2}$; the sequence matching score between sensors 1 and 3 can be designated $S_{seq\_1\_3}$; and the sequence matching score between sensors 2 and 3 can be designated $S_{seq\_2\_3}$. Then, for example, if $S_{seq\_1\_2}$ is below a certain threshold (healthy) but $S_{seq\_1\_3}$ and $S_{seq\_2\_3}$ are above the threshold, this is an indication that most likely sensor 3 is faulty. After this evaluation at the box 198, the faulty sensor identification is again complete at the box 192.

The fusion system state of health calculated by the state of health estimation module 58 and the faulty sensor identification from the fault identification module 60 can be used by the fusion system 12 or another onboard controller to modify system functions. For example, if one of three object sensors is determined to be faulty or providing inaccurate data, then the fusion system 12 can temporarily disregard input from the faulty sensor, until such time as that sensor is demonstrated to be providing reliable data. Other types of system behavior modification logic are also made possible by the fusion system state of health estimation methods disclosed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a state of health of an object detection fusion system, said method comprising:
providing target data from a first object sensor and a second object sensor, where the target data from the object sensors is used by the fusion system to calculate fused object detection data;
creating a context queue containing the target data from the object sensors, where the target data is arranged in sequential time frames which are stored in the context queue for a period of time defining a sliding time window;
computing matching scores using the target data in the context queue, including computing a single-frame matching score for each of the sequential time frames of target data in the context queue, and computing a sequence matching score for all of the time frames in the sliding time window, where computing the single-frame matching score includes arranging the target data from the first object sensor and the target data from the second object sensor in matched pairs, counting a number of matched pairs, computing a center-to-center distance for each of the matched pairs, and identifying a number of unmatched objects from the first object sensor and the second object sensor, and the single-frame matching score is calculated as a function of the number of matched pairs, the center-to-center distance for each of the matched pairs, the number of unmatched objects from the first object sensor and the second object sensor, and penalty costs for the unmatched objects; and calculating, using a microprocessor, the state of health of the fusion system based on the matching scores.

2. The method of claim 1 further comprising identifying one or more faulty sensors if the state of health of the fusion system is below a predetermined threshold.

3. The method of claim 2 wherein identifying one or more faulty sensors includes evaluating self-diagnostic information from the object sensors and identifying frequent target switching by one of the object sensors.

4. The method of claim 1 wherein computing a sequence matching score includes counting a number of identity switches among matched pairs of objects through all of the time frames in the sliding time window, where the number of identity switches is a number of times a target identity changes for either member of any of the matched pairs.

5. The method of claim 4 wherein the sequence matching score is calculated as a function of the single-frame matching scores of all of the time frames in the sliding time window, the number of identity switches, and a penalty cost for identity switches.

6. The method of claim 4 wherein a first sequence matching score is calculated using the first object sensor as a reference for the number of identity switches, and a second sequence matching score is calculated using the second object sensor as a reference for the number of identity switches.

7. The method of claim 1 wherein calculating the state of health of the fusion system includes using a regression function based on the matching scores, where lower values of the matching scores indicate a higher state of health of the fusion system.

8. The method of claim 1 wherein the first object sensor is a vision system and the second object sensor is a radar system.

9. The method of claim 8 further comprising aligning the target data from the radar system to a coordinate frame of the vision system before providing the target data from the radar system to the context queue.

10. A method for determining a state of health of an object detection fusion system on a vehicle, said method comprising:
providing target data from two or more object sensors, where the target data from the object sensors is used by the fusion system to calculate fused object detection data;
creating a context queue containing the target data from the object sensors, where the target data is arranged in sequential time frames which are stored in the context queue for a period of time defining a sliding time window;
computing matching scores using the target data in the context queue, including computing a single-frame matching score for each of the sequential time frames of target data in the context queue and computing sequence matching scores for all of the time frames in the sliding time window, where the sequence matching scores are computed using each of the object sensors in turn as a reference for a number of identity switches, where the number of identity switches is a number of times a target identity changes for either member of any of the matched pairs;
calculating, using a microprocessor, the state of health of the fusion system using a regression function based on the matching scores, where lower values of the matching scores indicate a higher state of health of the fusion system; and
identifying one or more faulty sensors if the state of health of the fusion system is below a predetermined threshold, including evaluating self-diagnostic information from the object sensors, identifying frequent switching of target identities by one of the object sensors, and identifying majority consistency in the sequence matching scores if more than two of the object sensors are used.

11. A system for determining a state of health of an object detection fusion system on a vehicle, said system comprising:
a context queue for storing target data from a vision system and target data from a radar system, said target data being used by the fusion system to calculate fused object detection data, where the target data is arranged in sequential time frames which are stored in the context queue for a period of time defining a sliding time window;
a matching score computation module for computing matching scores which indicate how well the target data from the vision system correlates with the target data from the radar system, where the matching score computation module computes a single-frame matching score for each of the sequential time frames of target data in the context queue and computes sequence matching scores for all of the time frames in the sliding time window, where the single-frame matching score is computed by arranging the target data from the vision system and the target data from the radar system in matched pairs, counting a number of matched pairs, computing a center-to-center distance for each of the matched pairs, identifying a number of unmatched objects from the vision system and the radar system, and calculating the single-frame matching score as a function of the number of matched pairs, the center-to-center distance for each of the matched pairs, the number of unmatched objects from the vision system and the radar system, and penalty costs for the unmatched objects, and where the sequence matching scores are calculated as a function of the single-frame matching scores of all of the time frames in the sliding time window, a number of identity switches among matched pairs of objects through all of the time frames in the sliding time window, and a penalty cost for identity switches, and where the sequence matching scores are calculated using each of the vision system and the radar system in turn as a reference for the number of identity switches, where the number of identity switches is a number of times a target identity changes for either member of any of the matched pairs; and
a state of health estimation module comprising a processor configured to calculate the state of health of the fusion system based on the matching scores, where lower values of the matching scores indicate a higher state of health of the fusion system.

12. The system of claim 11 further comprising a fault identification module for identifying whether the vision system or the radar system is providing faulty target data if the state of health of the fusion system is below a predetermined threshold.

13. The system of claim 11 further comprising an alignment module for aligning the target data from the radar system to a coordinate frame of the vision system before providing the target data from the radar system to the context queue.

* * * * *